Sept. 25, 1962

J. D. FLYNN 3,055,079

BURIAL CASKET SEAL

Filed Feb. 1, 1960

INVENTOR
JOSEPH D. FLYNN
BY Ralph L. Freeland Jr.
ATTORNEY

Sept. 25, 1962      J. D. FLYNN      3,055,079
BURIAL CASKET SEAL
Filed Feb. 1, 1960      3 Sheets-Sheet 2
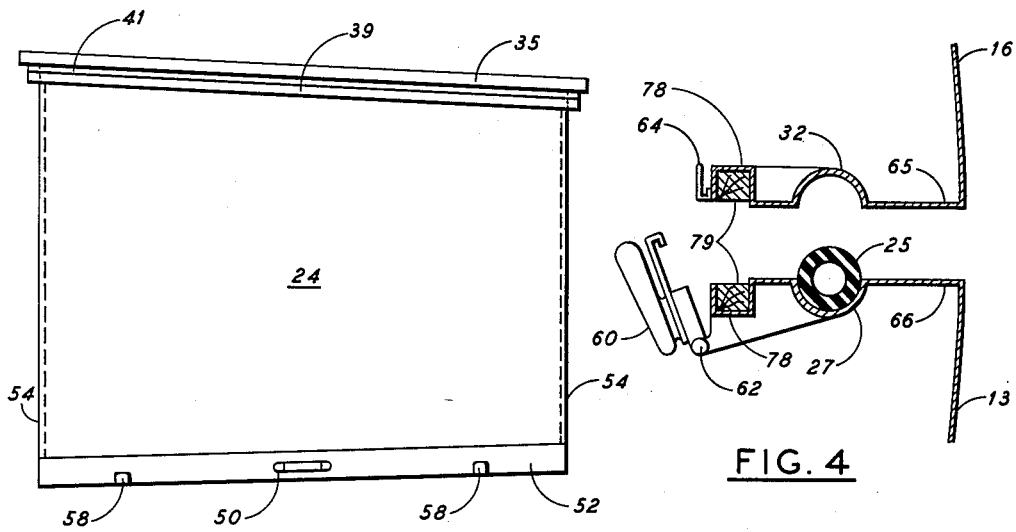
FIG. 3
FIG. 4
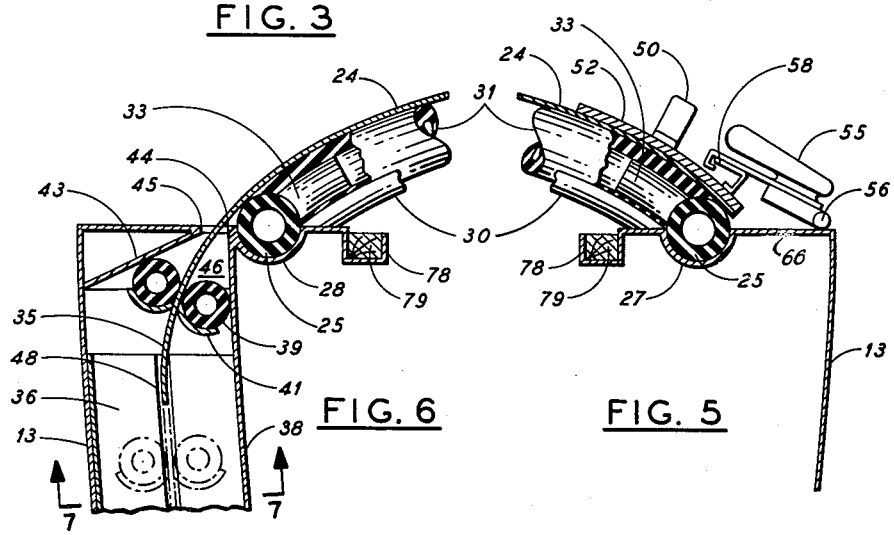
FIG. 6      FIG. 5
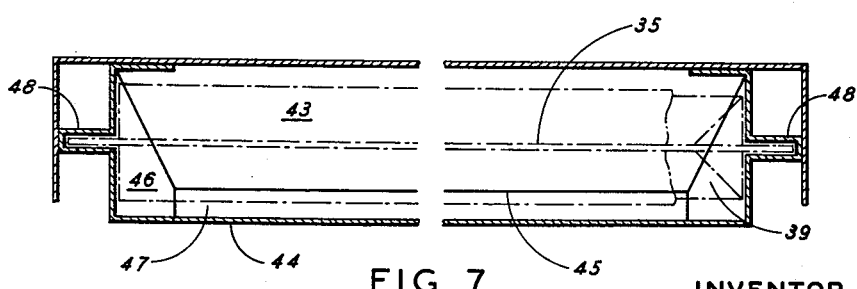
FIG. 7
INVENTOR
JOSEPH D. FLYNN
BY Ralph L. Freeland Jr.
ATTORNEY Sept. 25, 1962 J. D. FLYNN 3,055,079
BURIAL CASKET SEAL
Filed Feb. 1, 1960 3 Sheets-Sheet 3

INVENTOR
JOSEPH D. FLYNN
BY Ralph L. Freeland Jr.
ATTORNEY

United States Patent Office 3,055,079
Patented Sept. 25, 1962

3,055,079
BURIAL CASKET SEAL
Joseph D. Flynn, 422 Lee St., Apt. 2, Oakland, Calif.
Filed Feb. 1, 1960, Ser. No. 5,768
5 Claims. (Cl. 27—15)

The present invention relates to a unique hermetic sealing arrangement useful in burial caskets and the like. More particularly, it relates to an hermetic sealing arrangement for burial caskets of either full couch, half couch or hinged cap design.

It is a specific object of the present invention to provide a panel internal sealing arrangement for a burial casket in which the body portion is generally cylindrical in shape with convex ends and a cover member constructed either in one piece for a full couch or in a plurality of sections for a half couch or hinged cap unit.

In accordance with an important aspect of the invention, an internal sealing cover adapted to lie below the cover member when in sealing position is retractible into an internal cage member formed around one side of the cylindrical wall of the body portion of the casket. Desirably the opening to said cage member is adjacent the hinged side of the external cover member and said opening into the cage is so constructed that the inner edge of said sealing cover, when withdrawn from the cage, forms a seal with the cage opening and permits a circumferential tension to be applied to the transverse edges of the sealing cover when the forward edge is tension-locked to the access side of the casket.

In the construction of burial caskets, it has long been desired to have a quick and positive hermetic sealing arrangement that can be operated without special sealing devices. Such a sealing system is desirably an integral part of the casket, and does not interfere with decorative display of a body for funeral services. While many sealing systems requiring welding, or additional or auxiliary sealing plates and covers have been proposed, such arrangements are not widely used because of cost and inconvenience.

In the drawings:

FIGURE 3 is a top plan view of the flexible metal closure panel member forming the internal seal for the head portion of half couch unit shown in FIGURES 1 and 2.

FIGURE 4 is a partial cross-sectional end elevation taken in the direction of arrows 4—4 in FIGURE 1, illustrating the internal lock for the foot panel of the half couch casket in a partially open position above the base.

FIGURE 5 is an enlarged partial sectional view taken from the enclosure circle 5 in FIGURE 2 to illustrate the construction of the hermetic seal adjacent the center bulk head and the cam lock system at the front of the flexible closure panel for applying equal compression to all of the hermetic seals.

FIGURE 6 is an enlarged partial sectional view taken from the enclosure circle 6 in FIGURE 2 illustrating sealing of the closure panel with the base seal at the hinge edge and the T seal between the concealment cage and the panel for applying tension to said panel.

FIGURE 7 is a partial bottom plan view of the sealing surfaces of the concealment cage taken in the direction of arrows 7—7 of FIGURE 6.

Figure 1:
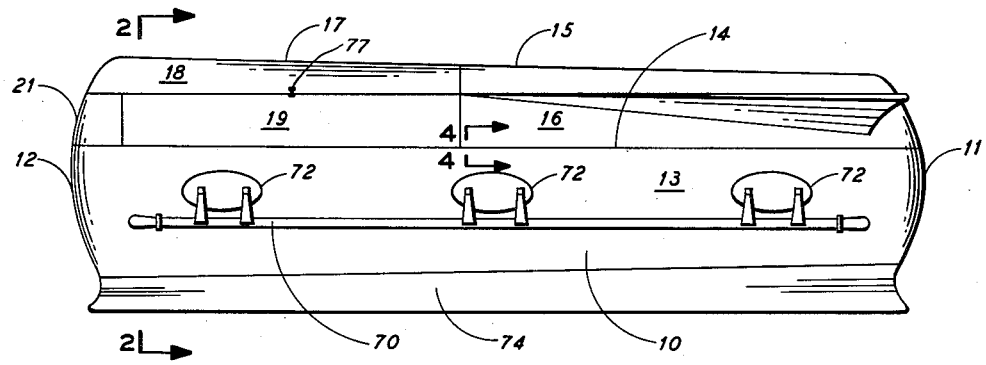
FIGURE 1 is a front elevation view of a half couch form of a generally cylindrical casket to which a preferred embodiment of an hermetic seal arrangement in accordance with the present invention has been applied.
Figure 8:
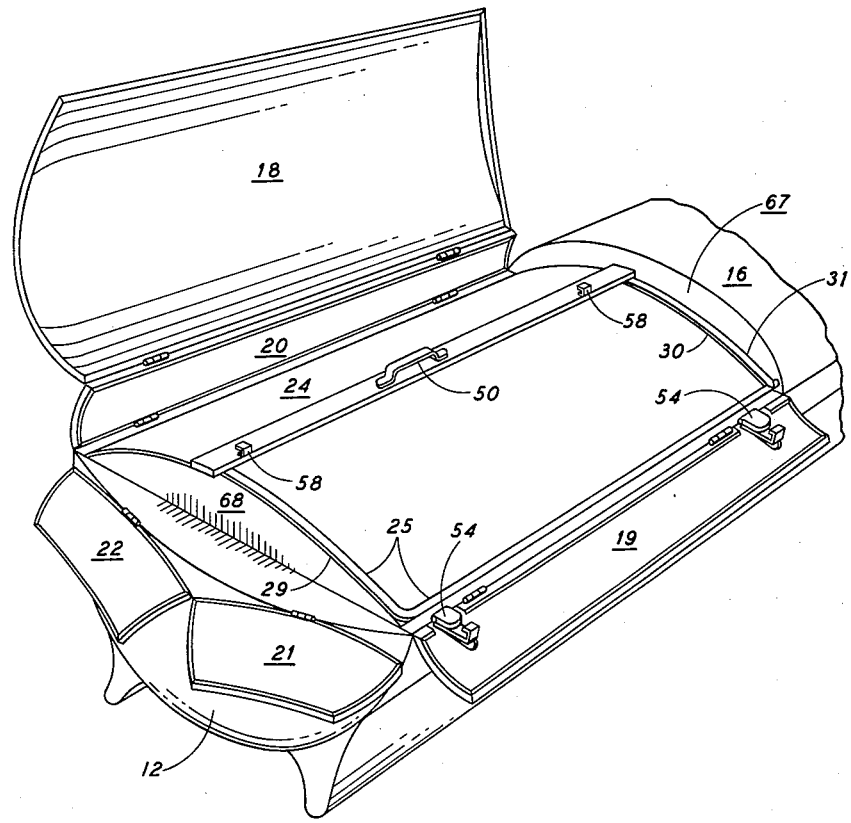
FIGURE 8 is a partial perspective view of the head end of the casket of FIGURE 1 shown in its open position with the hermetic closure panel member in a partially closed position.
Figure 9:
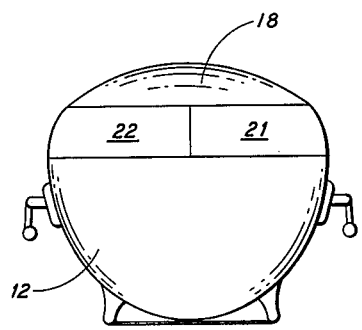
FIGURE 9 is an end elevation view of the casket shown in FIGURE 1.

Referring now to the drawings, and in particular to FIGURES 1 and 9, it will be noted that the present invention has been applied to a half couch style of casket 10, which in general has an elongated cylindrical body portion 10 that its preferably tapered between the head and foot ends. Desirably these foot and head ends or panels 11 and 12, respectively, are outwardly convex. The tapered cylindrical design is longitudinally severed along a plane, generally designated as 14, parallel to the axis of said cylinder that divides the unit into a unitary base portion 13 and a lid or cover portion 15. Where the casket is a full couch, of course, lid 15 is in one piece, but in the half-couch design of the present embodiment, lid 15 comprises a foot panel 16, and a head panel 17. If the casket is of the so-called hinged-cap design, top panel 18 of head panel 17 would be hinged to base 13 and the wings 19, 20, 21 and 22 would remain in their closed positions. However in the present instance for a half couch, head panel 17 comprises top panel 18, a pair of front and back wings 19 and 20, respectively, (best seen in FIGURE 8), and a pair of end wings 21 and 22. As shown in open position, each of these wings 19, 20, 21 and 22 is suitably hinged to the base along plane 14 so that the casket may be draped during funeral services, without interference by the open positions of these wing panels; however, as indicated, they may be promptly closed to assume the cylindrical-spherical design that characterizes its external appearance. It is to be noted that none of the hinged wings of head portion 17 form an hermetic sael for the interior of the casket.

Figure 2:
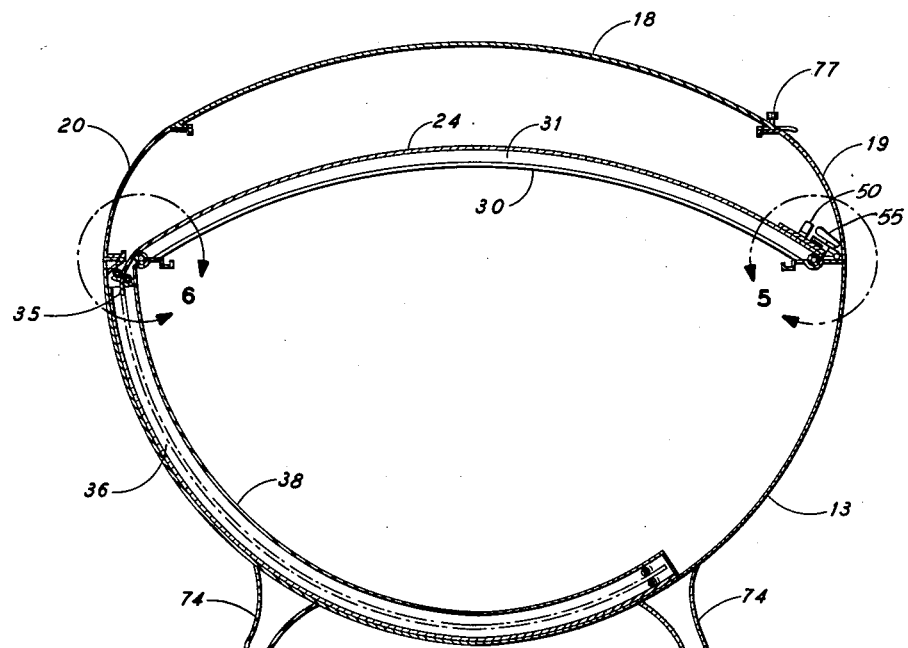
FIGURE 2 is a cross-sectional, and elevational view, taken in the direction of arrows 2—2 in FIGURE 1, illustrating the hermetic seal arrangement in its closed position.

Having now generally described a casket to which the present invention is applicable, attention is directed to the full-floating hermetic sealing arrangement for enclosing the interior thereof against atmospheric communication with the exterior of the casket body, which constitutes an important aspect of this invention. Reference is made paritcularly to FIGURE 2 wherein one side of a cage member 36 conforms to the cylindrical configuration of base portion 13. Cage 36 is enclosed by another cylindrical wall 38 to form a storage compartment into which a flexible metal sealing cover 24 retracts, as shown in phantom, when access to the interior of casket 10 is desired. Flexible cover 24 forms an inner hermetic seal for the casket interior. Cover 24 can be quickly drawn from its concealed location in cage 36 by handle 50 (FIGURE 8) and brought into the position shown in FIGURE 2 (and magnified in FIGURES 5 and 6). The primary function of this sheet-like cover 24 is to apply an equalized compressive force to hollow flexible gasket members that are sealed to form pneumatic tubes around the entire upper and open edge defined by parting plane 14 on base 13. For this purpose a principal gasket member 25, formed as a unitary, hollow, rubber tube, is seated in a partially circular channel 27 along the upper surface of inwardly turned flange 66 formed across the entire front edge of base 13. This single hollow, tubular gasket 25, as shown in FIGURE 8, turns at a right angle to channel 27 and continues in circular channel 29 across the upper edge of top bulkhead 68.

Tubular gasket 25 also continues in a channel 28 formed parallel to the rear, or hinged side, of head panel 17 and along its length. While not shown in the drawings, the same tubular gasket 25 extends across the parting plane through spherical end 11. In practice, gasket 25 may be joined and sealed at the center of hinged-wall channel 28 (FIGURE 6).

Where, as in the present embodiment, a half-couch unit includes means for opening a closing foot panel 16, for ready access to the entire interior of the casket, panel 16 forms a foot bulkhead 67 that supports a middle, transverse hollow and tubular gasket 31 in a partially circular channel 30, as best seen in FIGURES 2, 5, 6 and 8. As shown in FIGURES 5 and 6, the ends of tubular gasket 31 are sealed, as by plugs 33, to permit a pneumatic pressure greater than atmospheric to be created therein when pressure-equalizing cover 24 is brought into its compression exerting position. Additionally, the ends of gasket 31 are cut to conform to the upper surface of tubular gasket 25, but not interfere with contact upon closing by sealing cover 24.

As indicated above, the first step in sealing the casket in this embodiment is the closure of foot panel 16 onto base 13. FIGURE 4 discloses the preferred arrangement for securing such closure. As there indicated, cover panel 16 also includes an inwardly turned flange 65, that generally opposes flange 66, and contains another partially circular channel 32 that contacts gasket 25. In this regard, it is to be noted that the diameters of gasket 25 and channels 27 and 32 are so related that flanges 65 and 66 do not touch, even when locked together by cam lock 60 engaging striker 64 to apply compressive force to the entire foot half of gasket 25. The operation of cam lock 60, rotatable on pivot pin 62, to meet striker 64 is conventional, the purpose being to permit a mechanical advantage by rotation of its operating handle to increase the load between the lock and striker. Desirably this cam lock and striker are concealed within the foot portion of the casket, since ready access thereto is available by reaching through the open head portion, such as when cover 24 is in the position shown in FIGURE 8.

With the foot portion secured, as described above, flexible sealing cover 24 is pulled from its concealed position in cage 36 by handle 50 which is mounted on a stiffener section 52 secured to the leading edge of cover panel 24. When drawn to its full forward position, panel 24 extends entirely across the forward and rear parallel portions of hollow tubular gasket 25 and likewise over the portion of gasket 25 supported by bulkhead 68. At the same time one edge of cover 24 overlies transverse hollow gasket 31. Since, in accordance with this invention, cover 24 functions to apply an equalized pneumatic compressive force to unitary gasket 25 and to gasket 31, it is essential that said panel be "floating" on all edges. To this end, the trailing end, or edge 35 of panel 24 includes a pair of chanel members 41 that in cross section form a T with sealing panel 24 to support another unitary and fully closed hollow, tubular gasket 39, that is hereinafter called a T-seal gasket.

As indicated, in FIGURE 3, wherein the full assembly of sealing cover 24 is shown, and in FIGURE 7 where T-seal gasket 39 is shown in phantom, the single tubular construction of gasket 39 includes a full U-turn at both side edges 54 of cover 24. The function of said ends of T-seal gasket 39 is to equalize the pressure between the upper and lower surfaces of the gasket where it parallels the surfaces of panel 24 and to engage inclined plates 46 in mouth 47 of cage 36. At the same time, of course, mouth 47 of cage 36, defined by plates 46, inner wall 38 of cage 36 and inclined plate 43 forms a compressive stop against which T-seal gasket 39 can be forced. In this connection it is to be particularly noted that flexible plate 24 does not contact the metal edges 44 and 45 that form opening, or mouth, 47 so that the entire tensile load applied by cam locks 55 to strikers 58 and thus to sealing panel 24 is equalized by the "floating" pressure on sealed hollow gaskets 25, 31 and 39. Thus, when cam lock 55 is pivoted on shaft 56 from the position shown in FIGURE 8 (where it will not interfere with draping the casket) to the closed position of FIGURES 2 and 5, a tensile force of any desired magnitude may be quickly applied to sealing cover 24. By virtue of the present invention, this tensile force is, in turn, converted to a substantially equal compressive force on all of said gaskets 39, 25 and 31. Thus, these gaskets thereby form a pneumatic, pressure seal around the entire exposable edge of base 13, including the portion of gasket 25 between foot panel 16 and base 13.

Because of the necessary flexibility of panel 24, it is desirable to stiffen the lateral or side edges 54, as by rolling, turning or the like, to avoid wrinkling of said edge when tension is applied therealong. Additionally, because of said flexibility, I have found it desirable to include a set of guides or tracks 48 in concealment cage 36 to prevent cocking of panel 24 when it is pushed down into said cage or withdrawn for hermetic sealing of the casket. Preferably, there is sufficient length of trailing portion 35 of cover 24 to act as a leader into tracks 48.

For conventional portability of the casket by pall bearers, railhandles 70 are secured to the side of casket base 13 by lugs 72 secured by bolts, welding or the like to the exterior. The base support rails 74 may also include a cross plate 76 to permit the casket to be supported on a collapsible casket stand, called a catafalque, conventionally used by present-day undertaking establishments.

For purposes of draping the interior of the casket channels 78 are formed integral with, or tack welded, to the interior to support wood strips 79 to which such lining can be tacked.

The enclosure of the wing and cap panels to form head panel 17 is obvious by inspection of the accompanying drawings, particularly FIGURES 1 and 8. However, an access handle or latch 77, as shown in FIGURE 2, may be provided for entry to the pneumatic sealing portions of the casket. More elaborate locking devices can be provided, if desired.

While my novel hermetic seal has been illustrated and described in connection with sealing a casket, it can be used in sealing of large vessels or tanks where it is necessary to have easy access to the interior for loading, unloading, or cleaning, but an hermetic seal is required.

While only one embodiment of the invention has been illustrated and that in the form of a half-couch unit, it has been suggested how this invention may be readily used in connection with either full-couch or hinged-cap type caskets. Further, the sealing arrangement is applicable to other geometric forms of caskets and is not limited to the tapered cylindrical-spherical structure of the preferred embodiment. The sealing concept of a tensile-stressed sealing cover and hollow, sealed gaskets to which pneumatic pressure can be applied being essentially universal to caskets of conventional design when suitably modified in accordance with the teachings of this invention. Accordingly, I do not intend to limit the scope of the appended claims to the exact structure disclosed herein, but intend that they shall apply to the equivalents thereof.

I claim:

1. A burial casket having a generally cylindrical form comprising a semicylindrical base, a semicylindrical lid member, an inner, hermetical sealing arrangement comprising a sealing cover, said base including an inwardly turned flange member around the upper edge of said base, a unitary gasket member supported on said flange member and mating with said sealing cover, said sealing cover comprising a relatively flexible metal sheet, one edge of said sheet being parallel to the longitudinal axis of the casket and including a transverse member forming a T with said sheet, additional sealing means adjacent both sides of said sheet adjacent said transverse member, and a cage member formed parallel to the inner surface of said base for concealment of said sealing cover, said cage member having an opening outboard of said gasket member and forming a mating surface with said additional sealing means for said T and means for exerting tension to said sheet on the side opposite to said transverse member to compress both said gasket member and said additional sealing means and to secure said sealing cover to said flange for hermetically sealing said casket.

2. A burial casket comprising an outer, generally semicylindrical shell forming a base member, a lid member hinged at one edge of said base member, said base member including ends integral therewith in the form of portions of a sphere, an inner partial shell substantially concentric with said base member, an entryway between said inner and outer shells along said one edge of said base member, a metal cover member retractible between said shells, said cover member being sufficiently flexible to conform to said semicylindrical shell in its retracted position and adapted to be extended to cover said base member, and sealing means between the edges of said cover member and the upper edges of said base member.

3. A burial casket comprising a base member and a lid member hinged at one edge of said base member to open at least a part of said casket for access to the interior, a single hollow gasket having sealed ends supported around the upper edge of said base member against which said lid member closes, an inner sealing cover adapted to overlie at least a portion of said gasket exposed when said lid member is open, said sealing cover including a T member formed integral therewith, another hollow gasket on both sides of the cover adjacent said T member, means for engaging said T member with said base member at the hinged edge of said base member, and latch means between the other edge of said base member and said sealing cover for applying tension to said sealing cover transverse to said other gasket and to said base member gasket whereby said sealing cover applies compression to both of said gaskets when in its latched position.

4. For use in hermetically sealing a casket or the like, wherein the body portion thereof includes a base member having an enlarged opening to receive a corpse, flange members for said base member around said opening, a compartment conforming generally to at least a portion of the walls of said base member, a sheet-like closure member adapted to be retracted into said compartment to expose fully said enlarged opening, sealing means on said flange members, additional sealing means along inner and outer surfaces and adjacent one edge of said closure member, said additional sealing means being disposed to contact portions of said flange member and a wall of said base member adjacent the opening to said compartment, and tension producing locking means along the edge of said sheet member remote from said edge supporting said additional sealing means for securing said sheet member over said opening and to apply compressive force to all of said sealing means simultaneously.

5. A burial casket comprising a base, formed as a portion of an elongated cylinder that is longitudinally severed parallel to the axis of said cylinder, the opposite ends of said cylinder being closed by head and foot panels each formed as portions of a sphere and each of said panels being severed to mate with said base, the upper severed edges of said base and said head and foot panels having inwardly turned flanges to form a continuous support for a single sealing gasket, a lid having a shape corresponding to the cylindrical shape of said base and including ends formed as corresponding portions of a sphere to complete the enclosure of said casket, said lid being hinged along one upper edge of said base and outboard of said gasket support and said lid being adapted to lock at the opposite upper edge of said base outboard of said gasket support, and internal sealing means independent of said lid for sealing said base including a unitary compressible gasket mounted in said support, an inner sealing cover retractible into said base adapted to extend across said base to overlie said gasket at said hinged and lock edges of said base, and means to simultaneously tension said cover to compress said gasket and lock said cover across said base while said gasket is under compression to seal said base independently of said lid.

References Cited in the file of this patent

UNITED STATES PATENTS

| 98,730 | Algeo | Jan. 11, 1870 |
| 155,914 | Allen | Oct. 13, 1874 |
| 2,519,633 | Brown et al. | Aug. 22, 1950 |

FOREIGN PATENTS

| 22,940 | Austria | Feb. 10, 1906 |